(12) United States Patent
Berry et al.

(10) Patent No.: US 7,797,308 B2
(45) Date of Patent: Sep. 14, 2010

(54) MANAGING MULTIPLE LANGUAGES IN A DATA LANGUAGE

(75) Inventors: David Thomson Berry, Impington (GB); Nick Clarey, Cambridge (GB); Rajan Verma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 318 days.

(21) Appl. No.: 11/421,388

(22) Filed: May 31, 2006

(65) Prior Publication Data

US 2006/0271621 A1 Nov. 30, 2006

Related U.S. Application Data

(60) Provisional application No. 60/686,180, filed on May 31, 2005.

(51) Int. Cl.
*G06F 7/00* (2006.01)
*G06F 17/30* (2006.01)
*G06F 19/00* (2006.01)
*G06F 17/20* (2006.01)
*G06F 15/16* (2006.01)
*G06F 13/00* (2006.01)
*G06F 13/28* (2006.01)

(52) U.S. Cl. ........................... 707/716; 707/899; 704/8; 709/203; 711/100; 700/99

(58) Field of Classification Search ..................... 707/3, 707/205, 1, 999.001, 999.003, 999.205, 716, 707/899; 709/203; 711/100; 700/99; 704/8
See application file for complete search history.

(56) References Cited

FOREIGN PATENT DOCUMENTS

EP 1333374 A1 * 8/2003

OTHER PUBLICATIONS

Brown, Preston, "Getting the Most Out of X Resources," Jan. 11, 1995, published on Linux Journal (http://www.linuxjournal.com), retrieved Jun. 3, 2008.*

* cited by examiner

*Primary Examiner*—James Trujillo
*Assistant Examiner*—Bruce M Moser
(74) *Attorney, Agent, or Firm*—Robert J. O'Connell; Nicholas A. Cole (57) ABSTRACT

Described are various methods and apparatuses that provide for variants for multiple resource types and efficiently managing these resources by use of common variables and an organized file structure. A file structure is organize by a common variables, such as the $lang variable, and includes resource references such that once the common variable is defined, similar resources can be referenced using the same instruction by the use of modifying the common variable. Multiple resource types, including text, images as well as other resource types may be managed using the file structure disclosed herein.

31 Claims, 7 Drawing Sheets

MANAGING MULTIPLE LANGUAGES IN A DATA LANGUAGE

CROSS REFERENCE TO RELATED APPLICATION

This application claims benefit of U.S. Provisional Application Ser. No. 60/686,180, filed May 31, 2005, the entirety of which is hereby incorporated herein by this reference.

BACKGROUND OF THE INVENTION

1. Field of the Invention

The present invention generally relates to variable processing of software applications. More particularly, the invention relates to creating file structures and resource processing with common variables.

2. Description of the Related Art

Data languages are becoming a more pervasive way to program. Data languages include markup languages, such as those based on XML, including HTML, TRIGML (owned by QUALCOMM Incorporated). Data driving languages are extensively used in programming web-based applications but are not limited thereto. Examples of XML based languages also include billing and transaction processing applications.

Difficulties rise in a couple of instances when using data languages. For example, in developing a user interface (UI), it is desireable to have the availability to multiple languages for an application depending on the language desired by the application running on the device. For example, a wireless device used in France may want to access the term "bonjour" whereas a wireless device used in the United Kingdom may want to access the term "Hello" for the same purposes.

In addition to text, however, there may be other resource types that the application would like to vary based on the culture, language, or other variable. For example, the application may wish to display the Eiffel Tower as a backdrop if the language is selected as French, yet may wish to display Buckingham Palace for English. Similary, more risque pictures may be desired for those languages/cultures that the application developer believes are more appropriate versus more reserved images for those languages/cultures the application developer believes is more reserved.

Current methods use to address this problem is the use of language packs. Microsoft Word, for example, can install a language pack. This language pack merely changes a pointer value for a defined term. For example, a French language pack installed would substitute the menu option for "edit" the corresponding French word, such as "editer." Multiple language packs may be installed, but they become hard to manage as the number of language dependent resources gets large. Further, there is no solution to managing resources based on other variants.

Therefore, what is needed in the art is a method, apparatus and system for that allow the managing the language variants for multiple types of resources. Further, what is need is a method, apparatus and system for providing variants for multiple resource types and managing resources using multiple variants.

SUMMARY OF THE INVENTION

Systems and methods consistent with the present invention overcome the shortcomings of existing systems by creating systems, methods and apparatuses that provide for variants for multiple resource types and efficiently managing these resources by use of common variables and an organized file structure.

In one embodiment, a method for generating a structure for managing resources using a variable in a data language comprises receiving a plurality of resource references distinguished by a variable and building a structure using the variable and the plurality of resource references, wherein the plurality of resource references may be accessed by modifying the variable value.

In another embodiment, a method for generating a file structure to access similar resource reference distinguished by a common variable comprises dividing the file structure using the common variable type placing a value associated with each of the similar resource references in the same relative location within the file structure.

In yet another embodiment, a device for storing a file structure to access similar resource references distinguished by a common variable comprises a memory, the file structure stored in the memory, wherein the file structure is organized via a common variable and the similar resource references are located within the file structure as the same locations within different common variable values and a processor to retrieve the resource references using the common variable value.

In yet another embodiment, a computer readable medium containing computer executable instructions that when executed generates a file structure to access similar resource references distinguished by a common variable by performing the step of dividing the file structure using the common variable and placing a value associated with each of the similar resource references in the same relative location within the file structure referenced by the common variable.

In yet another embodiment, a method of managing resources in a data language comprises receiving a request for a resource using a parameter, modifying the parameter, and receiving a request for a related resource, modified using the parameter.

In yet another embodiment, a method for receiving a request for a resource value contained within a file structure organized using a common variable comprises storing a value of the common variable, receiving the request for a resource, wherein the request contains the common variable and resource reference, retrieving the value of the common variable, and retrieving the resource value using the retrieved common value and the resource reference by looking up a location in the file structure associated with the common value and the resource reference. This method may further include modifying the value of common variable, receiving a request for a second resource value contained within the file structure organized using the common variable and the resource reference, retrieving the modified common variable, retrieving a second resource value using the modified common variable and the resource reference.

Other objects, advantages and features of the present invention will become apparent after review of the herein after set forth Brief Description of the Drawings, Detailed Description of the Invention and the Claims.

BRIEF DESCRIPTION OF THE DRAWINGS

With reference to the figures in which like numerals represent like elements throughout.

DETAILED DESCRIPTION

Reference will now be made in detail to the presently exemplary and preferred embodiments of the invention as illustrated in the accompanying drawings, in which like reference characters designate like or corresponding parts throughout the several drawings. The nature, objectives and advantages of the present invention will become more apparent to those skilled in the art after considering the following detailed description in connection with the accompanying drawings.

Regarding use of terms, in this description, the terms "wireless device," "wireless telephone," and "mobile device" are used interchangeably. The term "application" as used herein is intended to encompass executable and nonexecutable software files, raw data, aggregated data, patches, content, user interfaces and user interface components, and other code segments. Further, like numerals refer to like elements throughout the several views, and the articles "a" and "the" includes plural references, unless otherwise specified in the description.

The following description relates to a user interface resource management method, apparatus and system using TrigML data language. TrigML is a data language useful in developing User Interfaces. TrigML is a product owned by QUALCOMM Corporation. Like data languages defined under XML, TrigML code includes the use of tags. It will be recognized by those skilled in the art that while the forgoing description is in terms of a UI, TrigML and managing languages, that it is applicable to other applications than UI, may be implemented in data languages other than TrigML, including other XML based languages, and may be use to manage other resource types using variants other than language.

Embodiments of the present invention include managing resources, such as text and images by managing languages. These may be any resources, including, but not limited to, text, images, page layout, program fragments, access to device components and functions.

Figure 1:
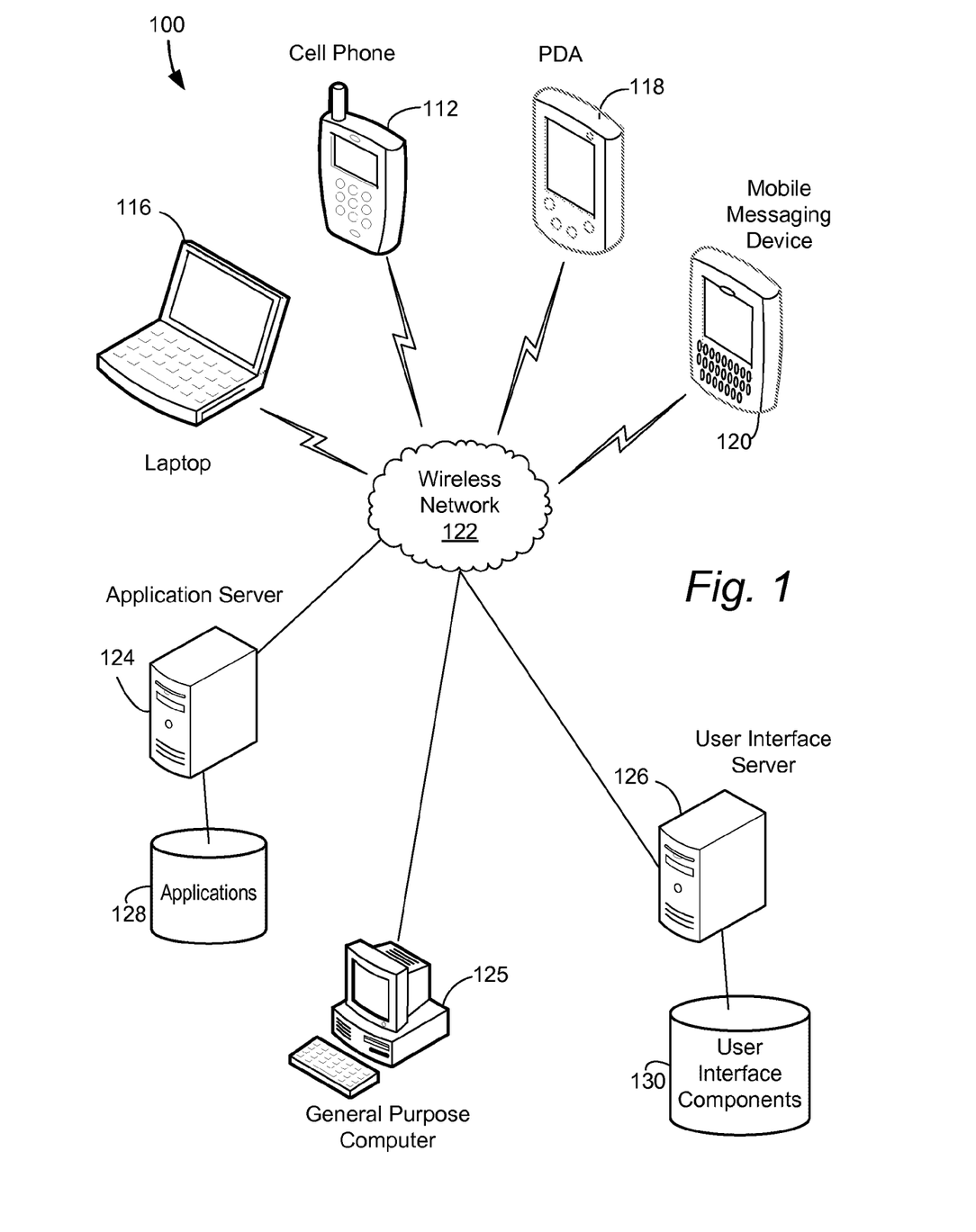
FIG. 1 is a functional diagram of a communications environment in which devices may operate in an embodiment of the present invention.

FIG. 1 is a functional diagram of a communications environment 100 in which devices may operate in an embodiment of the present invention. In this example, the communications environment 100 includes a wireless network 122. The wireless network 122 may be a communications network operated by a wireless service provider to provide data or telecommunications connectivity to mobile devices. Further, the wireless network 122 may also include wired networks, the Internet, Wide Area Networks, the Public Switch Telephone Network (PSTN) and other public and/or private networks so that devices may communicate to directly or indirectly using other devices connected to these to these networks.

In one example, the wireless network 122 may include a cellular telephone network. Several mobile devices are in communication with the wireless network 122, such as a cellular phone 112, a laptop computer 116, a PDA 118, and a mobile messaging device 120. These devices are only shown as illustrative of the many types of devices that may communicate over the wireless network 122.

Illustrated in FIG. 1 are an application server 124 and a user interface server 126. The user interface server 126 is a computing device that serves user interface components 130 (described in more detail below). These user interface components 130 may be downloaded to other devices connected to the wireless network 122. User interface components include code and/or data to render a user interface (such as function calls, menus, code for content calls, skins, etc.). Note, many other servers may be used connect to the network to deliver information including content servers. The type of information that can be made available is limitless, and very many different examples will be apparent to those skilled in the art. The user interface server 126 includes server software that is configured to provide the user interface components 130 to requesting devices over the wireless network 122.

The application server 124 is a computing device or system coupled to the wireless network 122 that makes software applications 128 available for download by the mobile devices. Generally stated, the applications 128 are downloadable by the devices connected to the wireless network 122, such as the cellular phone 112, for execution on those devices. In this particular implementation, at least one of the applications 128 served by the application download server 124 is a content-based application configured for execution on at least one of the mobile devices. The content-based application (the client) is configured to retrieve content from the content server (not shown) for presentation by the mobile device via a user interface.

Figure 2:
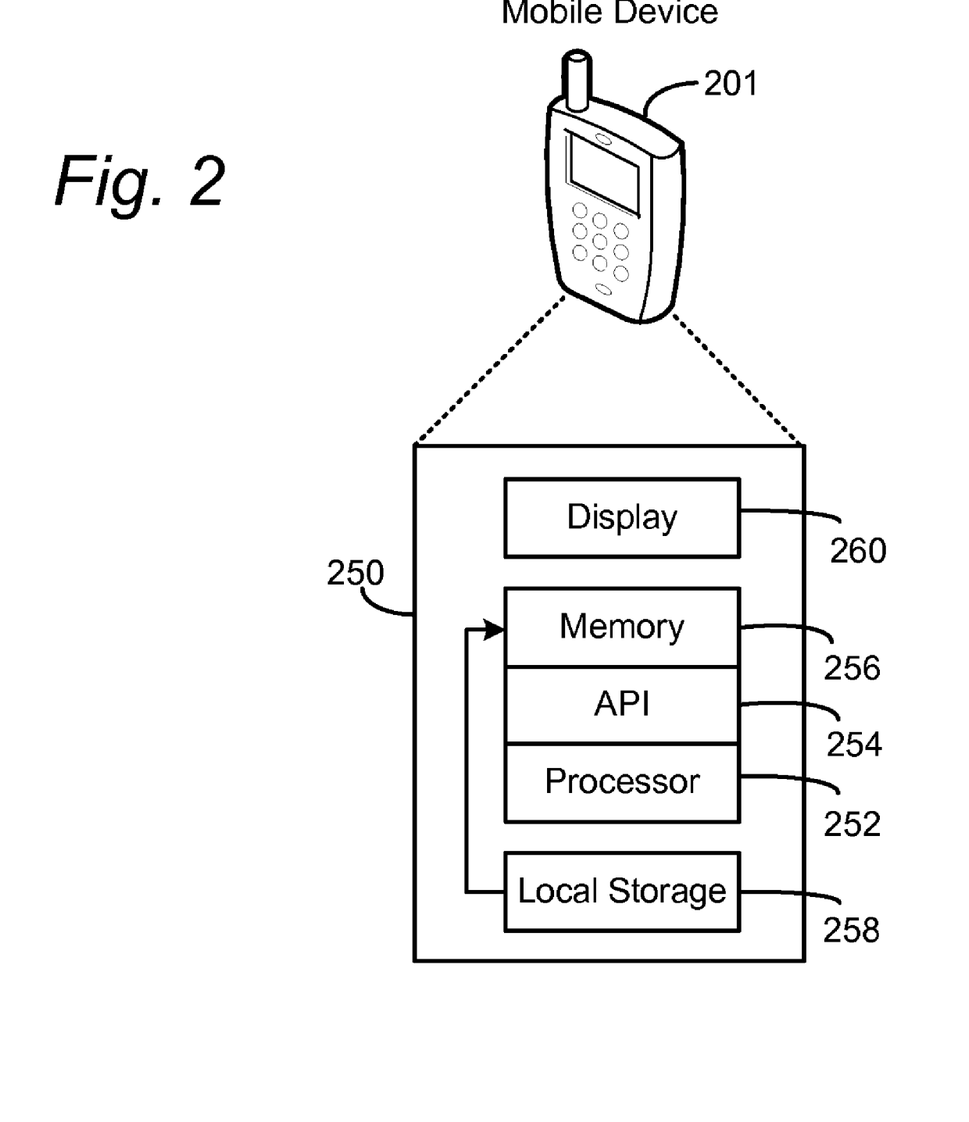
FIG. 2 is a functional block diagram generally illustrating the components of a sample mobile device in an embodiment of the present invention.

FIG. 2 is a functional block diagram generally illustrating the components of a sample mobile device 201, in an embodiment of the present invention. The mobile device 201 could be any device having computing functionality, such as a cellular telephone, a personal digital assistant, a handheld "palmtop" device, a laptop computer, a portable music player, a global positioning satellite (GPS) device, or the like.

The mobile device 201 has a computer platform 250 that can receive and execute software applications and display data. The computer platform 250 includes a processor 252, such as an application-specific integrated circuit "ASIC", digital signal processor ("DSP"), microprocessor, microcontroller, logic circuit, state machine, or other data processing device. The processor 252 executes the application programming interface ("API") layer 254 that interfaces with any resident programs in the memory 256 of the mobile device. The memory 256 can include random-access or read-only memory (RAM or ROM), EPROM, EEPROM, flash memory, or any memory common to computer platforms. The computer platform 250 also includes a local storage 258 that can hold software applications, files, or data not actively used in memory 256, such as software applications or user interface components downloaded from the user interface server 126 (FIG. 1). The local storage 258 is typically comprised of one or more flash memory cells, but can be any secondary or tertiary storage device as known in the art, such as magnetic media, EPROM, EEPROM, optical media, tape, or soft or hard disk.

The computer platform 250 also includes a display 260 that may be used by the software applications to display data using the user interface (not shown).

The components shown in FIG. 2 are typical of many types of mobile devices, but it will be appreciated that other components may be added to the mobile device 201 and in certain cases, some components shown in FIG. 2 may be omitted from the mobile device 201.

Figure 3:
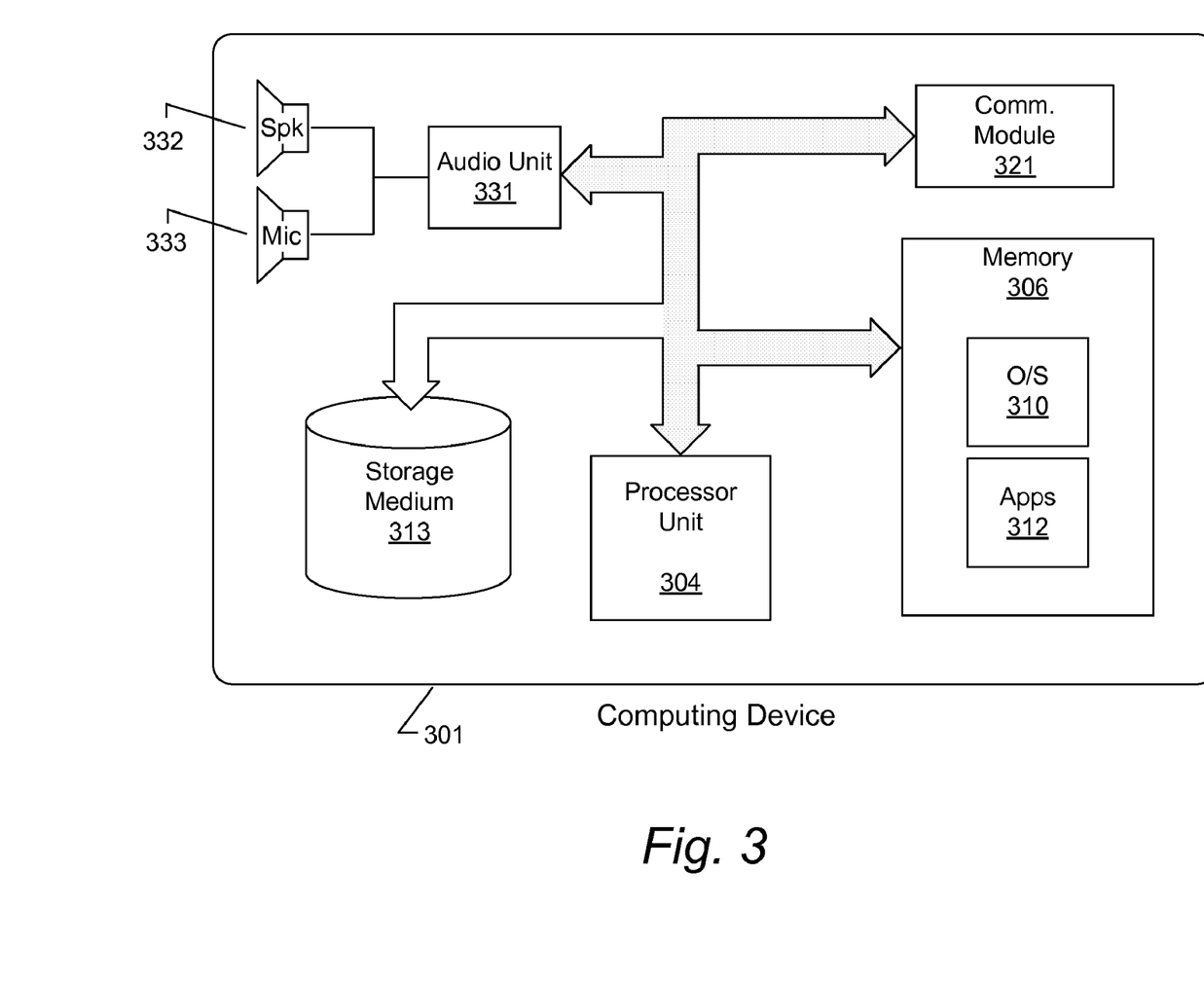
FIG. 3 is a functional block diagram generally illustrating the components of a sample computing device in an embodiment of the present invention.

FIG. 3 is a functional block diagram generally illustrating the core components of a sample computing device 301, in an embodiment of the present invention. The computing device 301 could be any fixed computing device, such as a desktop computer or server.

In this example, the computing device 301 includes a processor unit 304, a memory 306, a storage medium 313, and an audio unit 331. The processor unit 304 advantageously includes a microprocessor or a special-purpose processor such as a digital signal processor (DSP), but may in the alternative be any conventional form of processor, controller, microcontroller, or state machine. The processor unit 304 is coupled to the memory 306, which is advantageously implemented as RAM memory holding software instructions that are executed by the processor unit 304. In an alternate embodiment, the memory 306 could be composed of firmware or flash memory. In this embodiment, the software instructions stored in the memory 306 include an operating system 310 and one or more other applications 312, such as an application employing a user interface (not shown).

The mobile device 301 also includes a communications module 321 that enables bidirectional communication between the computing device 301 and one or more other computing devices, such as the mobile device. The communications module 321 may include components to enable RF or other wireless communications, such as a cellular telephone network, Bluetooth connection, wireless local area network, or perhaps a wireless wide area network. Alternatively, the communications module 321 may include components to enable land-line or hard-wired network communications, such as an Ethernet connection, RJ-11 connection, universal serial bus connection, IEEE 1394 (Firewire) connection, or the like. These are intended as non-exhaustive lists and many other alternatives are possible. The audio unit 331 is a component of the mobile device 301 that is configured to convert signals between analog and digital format. The audio unit 331 is used by the mobile device 301 to output sound using a speaker 332 and to receive input signals from a microphone 333.

FIG. 3 illustrates only certain components that are generally found in many conventional computing devices. Very many other components are also routinely found in particular implementations, and in certain cases, some components shown in FIG. 3 may be omitted. However, the computing device 301 shown in FIG. 3 is typical of the computing devices commonly found today.

Figure 4:
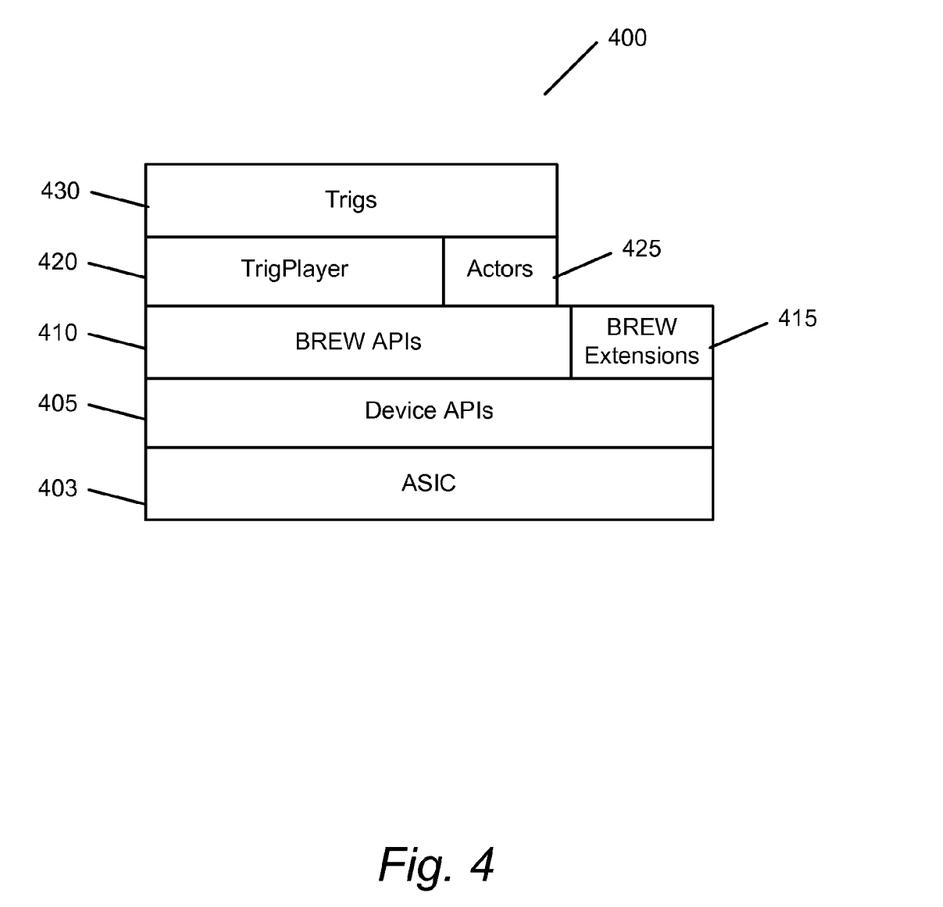
FIG. 4 is a block diagram illustrating an application architecture of a computer platform in an embodiment of the present invention.

FIG. 4 illustrates an application architecture of a device in an embodiment of the present invention. The device will include a "computer platform". A computer platform may refer to components of the device including of hardware, software or of both. For example, it may include the operating system, the underlying hardware components, including the chip, user interface hardware (e.g., displays, input and output devices), libraries, supporting APIs, additional extensions to the operating system, etc.

In one embodiment, the application architecture 400 of a wireless device includes Device APIs 405, BREW APIs 410, BREW Extensions 415, a Trigplayer 420, Actors 425, and Trigs 430. The Device APIs 405 may include those APIs used by a software platform to address functions associated specifically with that device, such as specific processor or ASIC functions, specific device hardware functionality, etc.

The BREW APIs 410 is a software platform developed by QUALCOMM Incorporated. The BREW APIs 410 provide the ability for applications to call Device APIs 405 and other functions without having to be written specifically for the device. In otherwords, it abstracts the specific aspects of the hardware from the application thereby allowing an application to be written for many devices without having to tailor, or requiring only slight tailoring, for each specific device on which the application executes.

A BREW extension 415 provides the ability to add additional capability to the BREW platform, such as offering MP3 players, Java Virtual Machines, etc.

A TrigPlayer 420, Trigs 430 and Actors 425 are components of the uiOne™ architecture developed by QUAL-COMM Incorporated. These components typically refer to user interface aspects of the device 400. In one embodiment, the Trigs 430 are compiled TrigML® code, and other resources (which may include metadata, text files and images) used by an application to render a user interface on the device 400. Multiple Trigs 430 and updates to Trigs, referred to as Triglets (not shown) may be used for the user interface.

TrigML code, owned by QUALCOMM Incorporated, is a data language based on XML and may be used for user interface presentation language for authoring Trigs 430 and includes advantages of mobile-targeted functionality, an interactive user interface event model, and pixel positioning among other advantages.

Actors 425 include underlying C code to connect Trigs to underlying Device APIs 405 and/or BREW APIs 410. Actors 425 may also serve as executables for input/output. And because actors connect to the underlying Device and BREW APIs, they have access to the computer platform functions.

The Trigplayer 420 may be implemented as a BREW extension 415 even though it is separated out in FIG. 4. The Trigplayer is used to render the user interface using the Trigs and actors.

It will be recognized that although the discussion of FIG. 4 is in terms of the QUALCOMM Incorporated's uiOne architecture (including compiled TrigML, Trigplayer, BREW APIs, etc) that this is for descriptive purposes and that the present invention include other data languages, computer and software platforms and device architectures.

Figure 5:
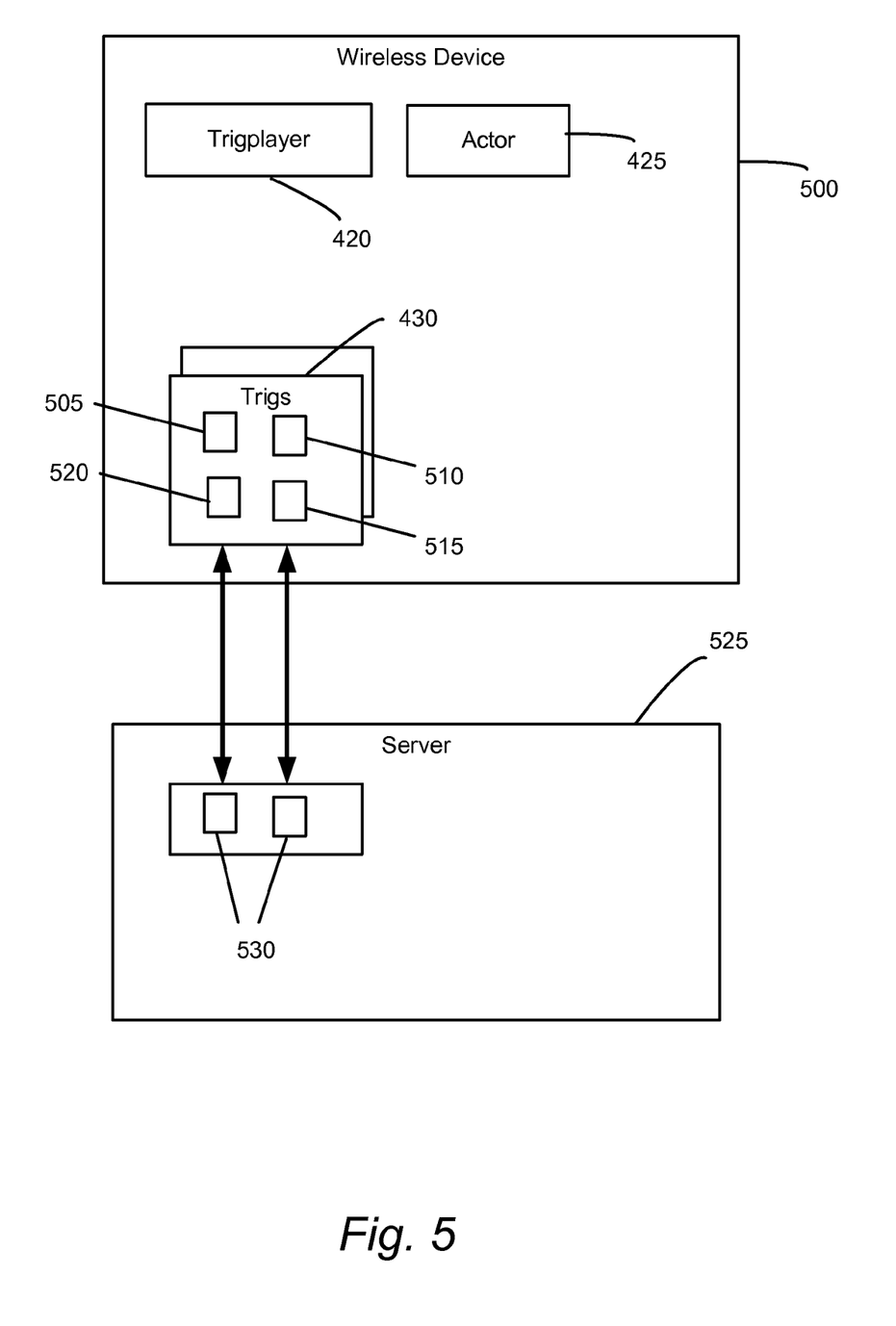
FIG. 5 is a block diagram illustrating the system of updating user interface components and an architecture depicting a trigplayer, actors and trigs in an embodiment of the present invention.

FIG. 5 is a block diagram illustrating the system of updating user interface components and an architecture depicting a trigplayer 420, actors 425 and trigs 430 in an embodiment of the present invention in an embodiment of the present invention. The device 500 includes a trigplayer 420, actors 425, and Trigs 430. The Trigs may include TrigML code 505, text strings 510, images 515 and update channels 520 (update channels may define URLs and timing schemes to fetch Triglets 530). Trigs may be updated over the air thereby allowing the user interface to be updated after the device has already left the manufacturer. A server 525 may be used to download new Trigs and or updated components of Trigs (e.g., Triglets 530) thus allowing the user interface for the device to be customized.

Figure 6:
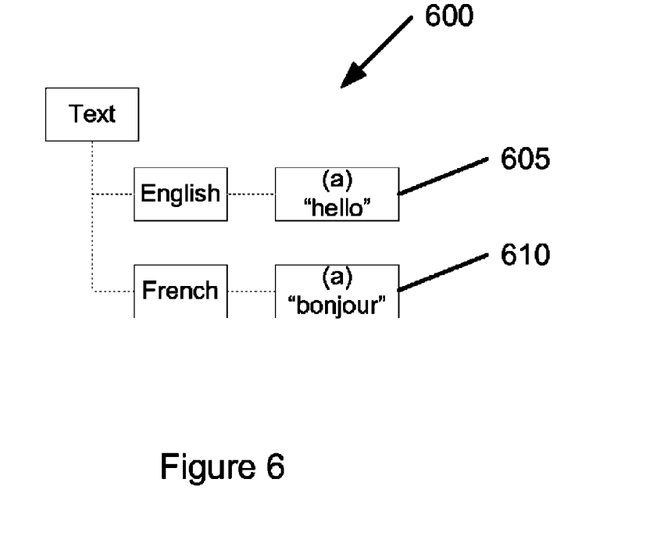
FIG. 6 is a block diagram illustrating a file structure associated with managing similar resource references organized by a common variable of language in an embodiment of the present invention.

FIG. 6 is a block diagram illustrating a file structure 600 associated with managing similar resource references organized by a common variable of language in an embodiment of the present invention. One embodiment includes the use of a creating the file structure 600 using a software development tool and a execution process to access the structure. One example of the software development tool includes the trigbuilder and trigpublisher owned by QUALCOMM Incorporated. An example of an execution process to access the structure includes the trigplayer. In building a user interface element, the trigbuilder receives attributes from a developer defining aspects of the element. This user interface element and the file structure may reside in the Trig described with respect to FIGS. 4 and 5. One attribute may include the $lang attribute. A file structure is organize by a common variable, such as the $lang variable, and includes resource references such that once the common variable is defined, similar resources values can be referenced using the same instruction by the use of modifying the common variable.

In building the system that allows managing multiple languages, the developer creates a TrigML element such as:

```
<text res="text/$lang/a">
```

The builder will also receive from the developer the languages the developer wishes to support. For example, the developer may select English and French. In the example above, the text resource "a" has been created and has an associated English and French value.

One embodiment creates a file structure based on the resource "a" and the languages selected by the developer. FIG. 6 depicts an example of this file structure 600. In this example, the text resource reference "a" in the English version has a value of "hello" 605 and "bonjour" 610 for the French version of the text resource "a".

Figure 7:
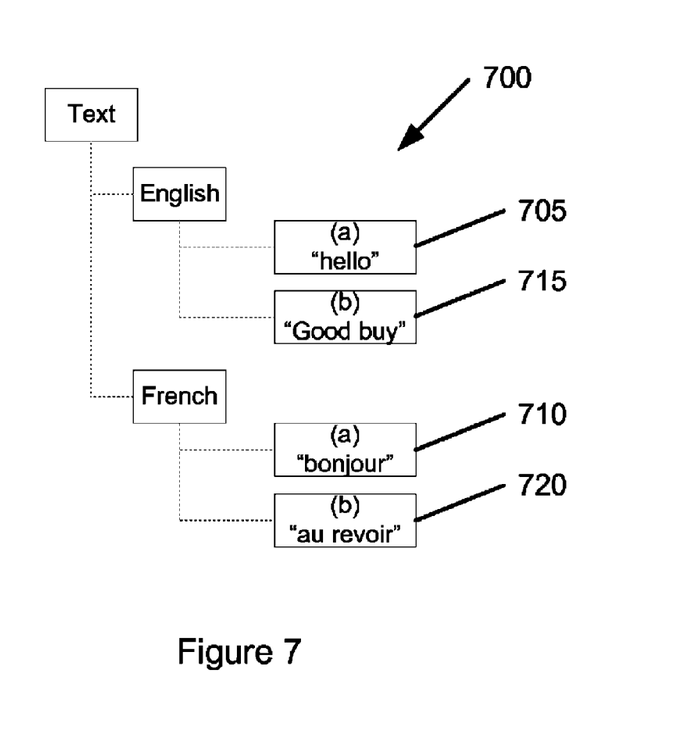
FIG. 7 is a illustrating a more complex file structure associated with managing multiple similar resource references organized by a common variable of language in an embodiment of the present invention; and, FIG. 8 illustrating another more complex file structure associated with managing multiple similar resource references and different reference types organized by a common variable of language in an embodiment of the present invention.

FIG. 7 is a illustrating a more complex file structure 700 associated with managing multiple similar resource references organized by a common variable of language in an embodiment of the present invention. Building the file structure 700 with a correlation between the resources simplifies their management. For example in FIG. 7, the text resource reference "a" represents two different representations of "hello" 705, 710 and the text resource "b" represents two different representations of "Goodbye" 715, 720.

Continuing with FIG. 7, the different resources are access using a $lang variable, such as:

text/$lang/a

If "$lang" is defined as "English", the above expression resolves to "hello". If the $lang is defined as "French", the above expression resolves to "bonjour." Note that the same resource reference "a" is used to access two representations of a related text resources, namely, "hello" and "bonjour".

Figure 8:
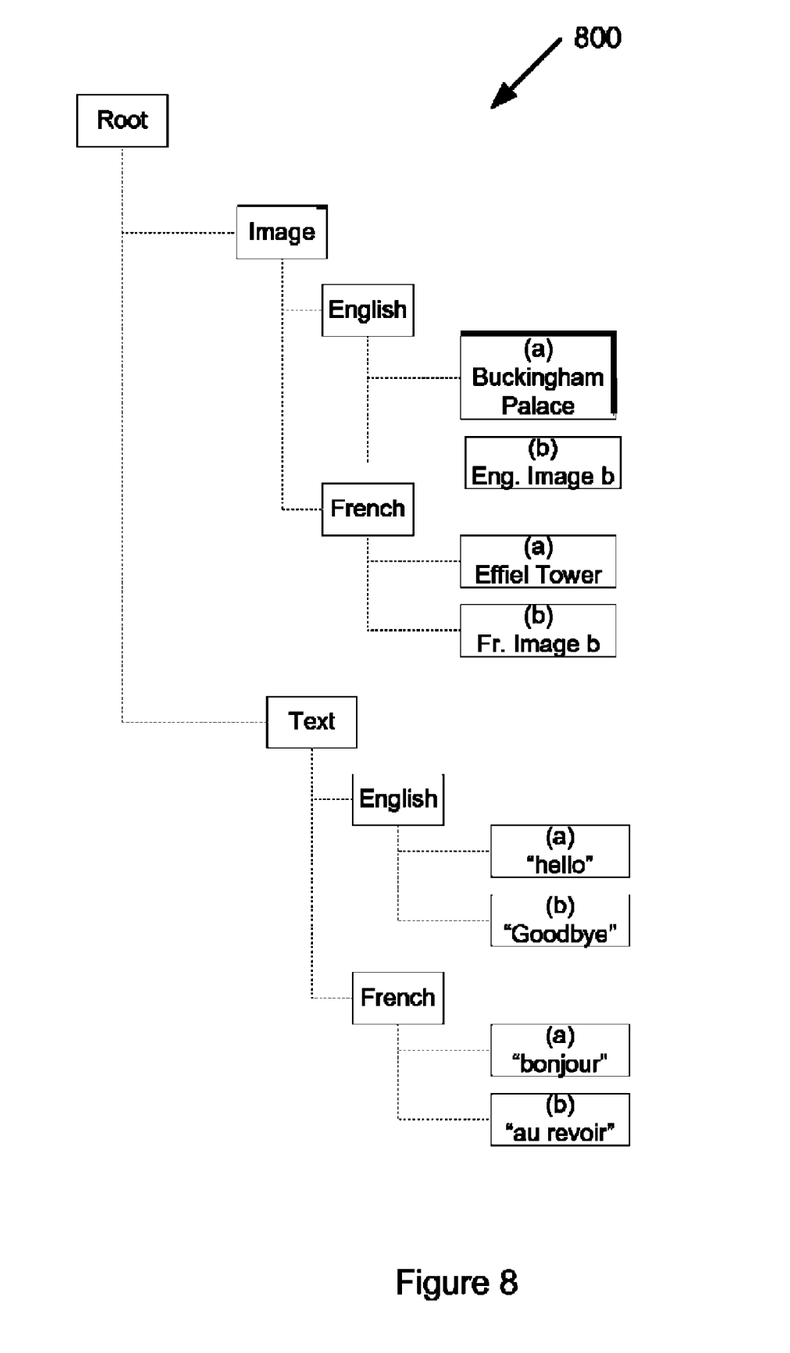

FIG. 8 illustrating another more complex file structure 800 associated with managing multiple similar resource references and different reference types (e.g., including text and images) organized by a common variable of language in an embodiment of the present invention. As described above and below, any resource type may be implemented using the management of a variable paradigm, not just manipulating text resources using a language variable.

Resolving the $lang Variable

In one embodiment, a trigplayer may be used to resolve the $lang variable in compiled code. However, it will be recognized by those skilled in the art that any parser or other code analyzer may be used. Further, the code is not required to be compiled.

The $lang variable may be set or changed by the device, the developer, application or other entity that may access the variables. In one paradigm, the $lang has a default value, for example, "English" and may be changed by the device at a later point.

Should the $lang value change, the trigplayer will attempt to use that value when determining which resource to access. Should the language resource not exists, the trigplayer may return to the last valid $lang value. For example, if the previous value of $lang was English and then was changed to German, and the following expression was encountered:

text/$lang/a

The trigplayer would attempt to find "text/German/a". However, if "German" does not exist, the trigplayer would revert to the previous $lang value that was valid. Therefore, if the $lang value of English was successfully used previously, the trigplayer would then try to find "text/English/a" when the above expression was encountered.

Alternatively, the trigplayer may have a default value for $lang that it always reverts to. And yet another alternative may be returning a error, such as resource not found error.

Embodiments were described in terms of language and a $lang variable. However, other variables may be used other than language in the same manner in order to control variable values. For example, a variable may be used to manage multiple devices supported, other device resources, such as screen sizes, functions, etc. It will be recognized that any resource may be managed using the methods and apparatus described herein.

Further Description of Embodiments of the Present Invention

If the path of a resource in a Trig or Triglet (a UI element) contains $lang and you compile for multiple languages then each resource data for each language will be included with the $lang part of the path replaced with the two letter country code. (Note: throughout the document unless otherwise noted the use of "Trig(s)" refers to Trig(s) or Triglet(s)).

E.g. A text resource contains three languages path is text/$lang/greeting,
en=hello
de=guten tag
fr=bonjour
These paths get expanded to
text/en/greeting
text/de/greeting
text/fr/greeting.

To reference the path in TrigML, the $lang variable is kept in the path and the Trigplayer looks up the language of the handset and selects the correct resource to include from the mulitple values present.

```
<?xml version="1.0" encoding="UTF-8"?>
<trigml>
  <layer>
    <group>
      <text res="text/$lang/mlang"/>
    </group>
  </layer>
</trigml>
```

Default Language

The default language is extra information used to carry in the Trig properties so that when the trig is compiled that the default language is the first language in the /config/supportedLangs data list of languages.

In one embodiment, the compiler can assume that it is the first language in the array passed to the compiler.

TrigPlayer

The Trigplayer currently reads a text resource located at /config/supportedLangs which contains a new line separated list of languages which the Trig supports. The first language in the list is the "default" language, which the player will fall back on should the language selected on the handset be unsupported.

If the above resource does not exist, then $lang will return the NULL string.

An example of behavior includes:
try the current handset language
if not supported by trig, fall back on last successfully used language
if no last successfully used language (e.g. first switch on), fall back on the first supported language Parcel Changes In another embodiment, the use of Parcelforce code abstracts the meaning of whether a resource is multi-language or not by a method on the resource object is_multilang. This method tests whether the string $lang is present in the resource path for the resource object.

When the resource path of an object is a new argument of lang which if it is passed in will substitute the presence of $lang with the passed in language. This code can then be called by the TrigCompiler when it is generating the resource paths to go into the bar file. All other use of get_resource_path will return the path without replacing the $lang for use in TrigBuilder for example.

There is also a call to unify checking to see if a Trig is multi-language or not. The method is_multilang on the Trig object checks all the resources it contains are multi-language. This common code is used in a number of places and follows good programming practice to put common code in one place.

By abstracting it in this way we can more easily move to a different implementation of multiple language handling in the future.

The above method and software design description may also be implemented in an apparatus, stored as instructions in RAM or in other memory storage devices. Although the processes presented in this document have been illustrated and described sequentially in a particular order, in other embodiments, the steps of the processes may be performed in different orders, multiple times, and/or in parallel. Further, in some embodiments, one or more steps described in the several processes may be performed as separate steps, combined into fewer steps, or possibly omitted entirely.

While the foregoing disclosure shows illustrative embodiments of the invention, it should be noted that various changes and modifications could be made to the described embodiments without departing from the spirit and scope of the invention as defined by the appended claims. Furthermore, although elements of the invention may be described or claimed in the singular, the plural is contemplated unless limitation to the singular is explicitly stated.

What is claimed is:

1. A method of managing multiple languages in a markup language on a computer device, the method comprising:
    defining a common variable using the markup language, wherein the common variable comprises a first common variable value and a second common variable value;
    creating a text resource reference using the markup language, wherein the text resource reference comprises a first resource value and a second resource value, wherein the first resource value represents a first version of a word in a first language and the second resource value represents a second version of the word in a second language;
    organizing a file structure on the computer device according to the common variable and including a correlation to the first resource value and the second resource value of the text resource reference, wherein the file structure defines a first path comprising the first common variable value and the text resource reference and a second path comprising the second common variable value and the text resource reference; and
    defining a markup language expression comprising the common variable and the text resource reference to represent one of the first version of the word or the second version of the word without including the first resource value or the second resource value in the markup language expression, such that a referenced one of the first common variable value or the second common variable value of the common variable determines which one of the first version of the word or the second version of the word to display.

2. The method of claim 1, wherein the text resource reference comprises one of a plurality of resource types for a root resource reference, wherein the plurality of resource types further comprises an image resource type comprising a first image resource value and a second image resource value, wherein the first image resource value represents a first version of an image corresponding to the first language and the second image resource value represents a second version of the image corresponding to the second language, wherein the organizing further correlates the first image resource value and the second image resource value of the image resource type, and defines a first image path comprising the first common variable value and the first image resource value and a second image path comprising the second variable value and the second image resource value, and further comprising defining a single image resource element comprising the common variable and the image resource reference to reference the first image resource value and the second image resource value, wherein a referenced one of the first common variable value or the second common variable value of the common variable determines which one of the first version of the image or the second version of the image to display.

3. The method of claim 1, wherein the first text resource value and the second text resource value are referenced using a same markup language expression.

4. A wireless device, comprising:
    a memory for storing an application configured to be executed on the wireless device; and,
    a processor, wherein the processor is configured to:
        define a common variable using a markup language, wherein the common variable comprises a first common variable value and a second common variable value;
        create a text resource reference using the markup language, wherein the text resource reference comprises a first resource value and a second resource value, wherein the first resource value represents a first version of a word in a first language and the second resource value represents a second version of the word in a second language;
        organize a file structure stored in the memory on the wireless device according to the common variable and including a correlation to the first resource value and the second resource value of the text resource reference, wherein the file structure defines a first path comprising the first common variable value and the text resource reference and a second path comprising the second common variable value and the text resource reference; and define a markup language expression comprising the common variable and the text resource reference to represent one of the first version of the word or the second version of the word without including the first resource value or the second resource value in the markup language expression, such that a referenced one of the first common variable or the second common variable value of the common variable determines which one of the first version of the word or the second version of the word to display.

5. The wireless device of claim 4, wherein the text resource reference comprises one of a plurality of resource types for a root resource reference, wherein the plurality of resource types further comprises an image resource type comprising a first image resource value and a second image resource value, wherein the first image resource value represents a first version of an image corresponding to the first language and the second image resource value represents a second version of the image corresponding to the second language, wherein the organizing further correlates the first image resource value and the second image resource value of the image resource type, and defines a first image path comprising the first common variable value and the first image resource value and a second image path comprising the second variable value and the second image resource value, and wherein the processor is configured to further define a single image resource element comprising the common variable and the image resource reference to reference the first image resource value and the second image resource value, wherein a referenced one of the first common variable value or the second common variable value of the common variable determines which one of the first version of the image or the second version of the image to display.

6. The wireless device of claim 4, wherein the first text resource value and the second text resource value are referenced using a same markup language expression.

7. A computer program product, comprising:
a computer-readable medium, comprising:
at least one instruction for defining a common variable using a markup language, wherein the common variable comprises a first common variable value and a second common variable value;
at least one instruction for creating a text resource reference using the markup language, wherein the text resource reference comprises a first resource value and a second resource value, wherein the first resource value represents a first version of a word in a first language and the second resource value represents a second version of the word in a second language;
at least one instruction for organizing a file structure on the computer program product according to the common variable and including a correlation to the first resource value and the second resource value of the text resource reference, wherein the file structure defines a first path comprising the first common variable value and the text resource reference and a second path comprising the second common variable value and the text resource reference, and wherein the first and second resource values is referenced using same instructions by use of modifying the common variable; and
at least one instruction for defining a markup language expression comprising the common variable and the text resource reference to represent one of the first version of the word or the second version of the word without including the first resource value or the second resource value in the markup language expression, such that a referenced one of the first common variable value or the second common variable value of the common variable determines which one of the first version of the word or the second version of the word to display.

8. The computer program product of claim 7, wherein the text resource reference comprises one of a plurality of resource types for a root resource reference, wherein the plurality of resource types further comprises an image resource type comprising a first image resource value and a second image resource value, wherein the first image resource value represents a first version of an image corresponding to the first language and the second image resource value represents a second version of the image corresponding to the second language, wherein the organizing further correlates the first image resource value and the second image resource value of the image resource type, and defines a first image path comprising the first common variable value and the first image resource value and a second image path comprising the second variable value and the second image resource value, and wherein the computer-readable medium further comprises at least one instruction for defining a single image resource element comprising the common variable and the image resource reference to reference the first image resource value and the second image resource value, wherein a referenced one of the first common variable value or the second common variable value of the common variable determines which one of the first version of the image or the second version of the image to display.

9. The computer program product of claim 7, wherein the first text resource value and the second text resource value are referenced using a same markup language expression.

10. A wireless device, comprising:
a processor configured to execute an application;
means for defining a common variable using a markup language, wherein the common variable comprises a first common variable value and a second common variable value;
means for creating a text resource reference using the markup language, wherein the text resource reference comprises a first resource value and a second resource value, wherein the first resource value represents a first version of a word in a first language and the second resource value represents a second version of the word in a second language;
means for organizing a file structure on the wireless device according to the common variable and including a correlation to the first resource value and the second resource value of the text resource reference, wherein the file structure defines a first path comprising the first common variable value and the text resource reference and a second path comprising the second common variable value and the text resource reference; and
means for defining a markup language expression comprising the common variable and the text resource reference to represent one of the first version of the word or the second version of the word without including the first resource value or the second resource value in the markup language expression, such that a referenced one of the first common variable value or the second common variable value of the common variable determines which one of the first version of the word or the second version of the word to display.

11. The wireless device of claim 10, wherein the text resource reference comprises one of a plurality of resource types for a root resource reference, wherein the plurality of resource types further comprises an image resource type comprising a first image resource value and a second image resource value, wherein the first image resource value represents a first version of an image corresponding to the first language and the second image resource value represents a second version of the image corresponding to the second language, wherein the organizing further correlates the first image resource value and the second image resource value of the image resource type, and defines a first image path comprising the first common variable value and the first image resource value and a second image path comprising the second variable value and the second image resource value, and further comprising means for defining a single image resource element comprising the common variable and the image resource reference to reference the first image resource value and the second image resource value, wherein a referenced one of the first common variable value or the second common variable value of the common variable determines which one of the first version of the image or the second version of the image to display.

12. The wireless device of claim 10, wherein the first text resource value and the second text resource value are referenced using a same markup language expression.

13. A method of managing resources in a markup language on a computer device, comprising:
defining a common variable using the markup language, wherein the common variable comprises a first common variable value and a second common variable value;
creating a text resource reference using the markup language, wherein the text resource reference comprises a first resource value and a second resource value, wherein the first resource value represents a first version of a word in a first language and the second resource value represents a second version of the word in a second language;
organizing a file structure on the computer device according to the common variable and including a correlation to the first resource value and the second resource value of the text resource reference, wherein the file structure defines a first path comprising the first common variable value and the text resource reference and a second path comprising the second common variable value and the text resource reference;
defining a markup language expression comprising the common variable and the text resource reference to represent one of the first version of the word or the second version of the word without including the first resource value or the second resource value in the markup language expression; and
determining a referenced one of the first common variable value or the second common variable value of the common variable to determine which one of the first version of the word or the second version of the word to display.

14. The method of claim 13, wherein the text resource reference comprises one of a plurality of resource types for a root resource reference, wherein the plurality of resource types further comprises an image resource type comprising a first image resource value and a second image resource value, wherein the first image resource value represents a first version of an image corresponding to the first language and the second image resource value represents a second version of the image corresponding to the second language, wherein the organizing further correlates the first image resource value and the second image resource value of the image resource type, and defines a first image path comprising the first common variable value and the first image resource value and a second image path comprising the second variable value and the second image resource value, and further comprising defining a single image resource element comprising the common variable and the image resource reference to reference the first image resource value and the second image resource value, wherein a referenced one of the first common variable value or the second common variable value of the common variable determines which one of the first version of the image or the second version of the image to display.

15. The method of claim 13, wherein the first text resource value and the second text resource value are referenced using a same markup language expression.

16. A wireless device, comprising:
a memory for storing an application configured to be executed on the wireless device; and
a processor, wherein the processor is configured to:
define a common variable using a markup language, wherein the common variable comprises a first common variable value and a second common variable value;
create a text resource reference using the markup language, wherein the text resource reference comprises a first resource value and a second resource value, wherein the first resource value represents a first version of a word in a first language and the second resource value represents a second version of the word in a second language;
organize a file structure stored in the memory on the wireless device according to the common variable and including a correlation to the first resource value and the second resource value of the text resource reference, wherein the file structure defines a first path comprising the first common variable value and the text resource reference and a second path comprising the second common variable value and the text resource reference;
define a markup language expression comprising the common variable and the text resource reference to represent one of the first version of the word or the second version of the word without including the first resource value or the second resource value in the markup language expression; and
determine a referenced one of the first common variable value or the second common variable value of the common variable using a markup language interpreter to determine which one of the first version of the word or the second version of the word to display.

17. The wireless device of claim 16, wherein the text resource reference comprises one of a plurality of resource types for a root resource reference, wherein the plurality of resource types further comprises an image resource type comprising a first image resource value and a second image resource value, wherein the first image resource value represents a first version of an image corresponding to the first language and the second image resource value represents a second version of the image corresponding to the second language, wherein the organizing further correlates the first image resource value and the second image resource value of the image resource type, and defines a first image path comprising the first common variable value and the first image resource value and a second image path comprising the second variable value and the second image resource value, and wherein the process is configured to further define a single image resource element comprising the common variable and the image resource reference to reference the first image resource value and the second image resource value, wherein a referenced one of the first common variable value or the second common variable value of the common variable determines which one of the first version of the image or the second version of the image to display.

18. The wireless device of claim 16, wherein the first text resource value and the second text resource value are referenced using a same markup language expression.

19. A computer program product, comprising:
a computer-readable medium, comprising:
at least one instruction for defining a common variable using a markup language, wherein the common variable comprises a first common variable value and a second common variable value;
at least one instruction for creating a text resource reference using the markup language, wherein the text resource reference comprises a first resource value and a second resource value, wherein the first resource value represents a first version of a word in a first language and the second resource value represents a second version of the word in a second language;
at least one instruction for organizing a file structure on the computer program product according to the common variable and including a correlation to the first resource value and the second resource value of the text resource reference, wherein the file structure defines a first path comprising the first common variable value and the text resource reference and a second path comprising the second common variable value and the text resource reference;
at least one instruction for defining a markup language expression comprising the common variable and the text resource reference to represent one of the first version of the word or the second version of the word without including the first resource value or the second resource value in the markup language expression; and
at least one instruction for determining a referenced one of the first common variable value or the second common variable value of the common variable to determine which one of the first version of the word or the second version of the word to display.

20. The computer program product of claim 19, wherein the text resource reference comprises one of a plurality of resource types for a root resource reference, wherein the plurality of resource types further comprises an image resource type comprising a first image resource value and a second image resource value, wherein the first image resource value represents a first version of an image corresponding to the first language and the second image resource value represents a second version of the image corresponding to the second language, wherein the organizing further correlates the first image resource value and the second image resource value of the image resource type, and defines a first image path comprising the first common variable value and the first image resource value and a second image path comprising the second variable value and the second image resource value, and wherein the computer-readable medium further comprises at least one instruction for defining a single image resource element comprising the common variable and the image resource reference to reference the first image resource value and the second image resource value, wherein a referenced one of the first common variable value or the second common variable value of the common variable determines which one of the first version of the image or the second version of the image to display.

21. The computer program product of claim 19, wherein the first text resource value and the second text resource value are referenced using a same markup language expression.

22. A wireless device, comprising:
means for defining a common variable using a markup language, wherein the common variable comprises a first common variable value and a second common variable value;
means for creating a text resource reference using the markup language, wherein the text resource reference comprises a first resource value and a second resource value, wherein the first resource value represents a first version of a word in a first language and the second resource value represents a second version of the word in a second language;
means for organizing a file structure on the computer program product according to the common variable and including a correlation to the first resource value and the second resource value of the text resource reference, wherein the file structure defines a first path comprising the first common variable value and the text resource reference and a second path comprising the second common variable value and the text resource reference;
means for defining a markup language expression comprising the common variable and the text resource reference to represent one of the first version of the word or the second version of the word without including the first resource value or the second resource value in the markup language expression; and
means for determining a referenced one of the first common variable value or the second common variable value of the common variable to determine which one of the first version of the word or the second version of the word to display.

23. The wireless device of claim 22, wherein the text resource reference comprises one of a plurality of resource types for a root resource reference, wherein the plurality of resource types further comprises an image resource type comprising a first image resource value and a second image resource value, wherein the first image resource value represents a first version of an image corresponding to the first language and the second image resource value represents a second version of the image corresponding to the second language, wherein the organizing further correlates the first image resource value and the second image resource value of the image resource type, and defines a first image path comprising the first common variable value and the first image resource value and a second image path comprising the second variable value and the second image resource value, and further comprising means for defining a single image resource element comprising the common variable and the image resource reference to reference the first image resource value and the second image resource value, wherein a referenced one of the first common variable value or the second common variable value of the common variable determines which one of the first version of the image or the second version of the image to display.

24. The wireless device of claim 22, wherein the first text resource value and the second text resource value are referenced using a same markup language expression.

25. A method of managing resources in a markup language on a computer device, comprising:

providing a file structure in the markup language having a common variable and a first text resource reference, wherein the common variable comprises a first common variable value and a second common variable value, wherein the first text resource reference includes a first resource value and a second resource value, wherein the first resource value represents a first version of a first word in a first language and the second resource value represents a second version of the first word in a second language, wherein the file structure is organized according to the common variable and including a correlation to the first resource value and the second resource value of the first text resource reference, and wherein the file structure defines a first path comprising the first common variable value and the first text resource reference and a second path comprising the second common variable value and the first text resource reference;

defining a markup language expression comprising the common variable and the text resource reference to represent one of the first version of the word or the second version of the word without including the first resource value or the second resource value in the markup language expression; and determining a referenced one of the first common variable value or the second common variable value of the common variable to determine which one of the first version of the word or the second version of the word to display.

26. The method of claim 25, further comprising:

providing a second text resource reference within the file structure wherein the second text resource reference includes at least a third resource value and a fourth resource value, wherein the third resource value represents a first version of a second word in the first language and the fourth resource value represents a second version of the second word in the second language; and resolving the common variable using a markup language interpreter in order to determine whether to display the first version of the second word or the second version of the second word.

27. The method of claim 25, wherein the text resource reference comprises one of a plurality of resource types for a root resource reference, wherein the plurality of resource types further comprises an image resource type comprising a first image resource value and a second image resource value, wherein the first image resource value represents a first version of an image corresponding to the first language and the second image resource value represents a second version of the image corresponding to the second language, wherein the organizing further correlates the first image resource value and the second image resource value of the image resource type, and defines a first image path comprising the first common variable value and the first image resource value and a second image path comprising the second variable value and the second image resource value, and further comprising defining a single image resource element comprising the common variable and the image resource reference to reference the first image resource value and the second image resource value, wherein a referenced one of the first common variable value or the second common variable value of the common variable determines which one of the first version of the image or the second version of the image to display.

28. The method of claim 25, wherein the first text resource value and the second text resource value are referenced using a same markup language expression.

29. A wireless device, comprising:

a memory for storing an application configured to be executed on the wireless device; and a processor, wherein the processor is configured to:

provide a file structure stored in the memory and described in a markup language having a language variable and a first text resource reference, wherein the file structure has a common variable comprising a first common variable value and a second common variable value, wherein the first text resource reference includes a first resource value and a second resource value, wherein the first resource value represents a first version of a first word in a first language and the second resource value represents a second version of the first word in a second language, wherein the file structure is organized according to the common variable and including a correlation to the first resource value and the second resource value of the first text resource reference, and wherein the file structure defines a first path comprising the first common variable value and the first text resource reference and a second path comprising the second common variable value and the first text resource reference;

a markup language expression comprising the common variable and the text resource reference to represent one of the first version of the word or the second version of the word without including the first resource value or the second resource value in the markup language expression; and determine a referenced one of the first common variable value or the second common variable value of the common variable using a markup language interpreter to determine which one of the first version of the word or the second version of the word to display.

30. The wireless device of claim 29, wherein the text resource reference comprises one of a plurality of resource types for a root resource reference, wherein the plurality of resource types further comprises an image resource type comprising a first image resource value and a second image resource value, wherein the first image resource value represents a first version of an image corresponding to the first language and the second image resource value represents a second version of the image corresponding to the second language, wherein the organizing further correlates the first image resource value and the second image resource value of the image resource type, and defines a first image path comprising the first common variable value and the first image resource value and a second image path comprising the second variable value and the second image resource value, and wherein the process is configured to further define a single image resource element comprising the common variable and the image resource reference to reference the first image resource value and the second image resource value, wherein a referenced one of the first common variable value or the second common variable value of the common variable determines which one of the first version of the image or the second version of the image to display.

31. The wireless device of claim 29, wherein the first text resource value and the second text resource value are referenced using a same markup language expression.

* * * * *

UNITED STATES PATENT AND TRADEMARK OFFICE
CERTIFICATE OF CORRECTION

| | | |
|---|---|---|
| PATENT NO. | : 7,797,308 B2 | |
| APPLICATION NO. | : 11/421388 | |
| DATED | : September 14, 2010 | |
| INVENTOR(S) | : Berry et al. | |

It is certified that error appears in the above-identified patent and that said Letters Patent is hereby corrected as shown below:

Column 12, line 1, claim 7: "values is" to read as --values are--

Signed and Sealed this
Twelfth Day of July, 2011

David J. Kappos
*Director of the United States Patent and Trademark Office*